US011216425B2

(12) United States Patent
Pisipati et al.

(10) Patent No.: US 11,216,425 B2
(45) Date of Patent: Jan. 4, 2022

(54) SYSTEM AND METHOD OF RECOGNIZING DATA IN A TABLE AREA FROM UNSTRUCTURED DATA

(71) Applicant: Infosys Limited, Bangalore (IN)

(72) Inventors: Radha Krishna Pisipati, Hyderabad (IN); Jianlin Zhang, Santa Clara, CA (US); Shreyas Bettadapura Guruprasad, Bangalore (IN); Uma Devi Ganugula, Hyderabad (IN); Krishnamurty Sai Deepak, Bengaluru (IN)

(73) Assignee: INFOSYS LIMITED, Bangalore (IN)

( * ) Notice: Subject to any disclaimer, the term of this patent is extended or adjusted under 35 U.S.C. 154(b) by 21 days.

(21) Appl. No.: 16/584,585

(22) Filed: Sep. 26, 2019

(65) Prior Publication Data

US 2020/0097451 A1 Mar. 26, 2020

(30) Foreign Application Priority Data

Sep. 26, 2018 (IN) .............................. 201841036310

(51) Int. Cl.
*G06F 16/21* (2019.01)
*G06F 16/22* (2019.01)
*G06F 16/93* (2019.01)
*G06F 16/25* (2019.01)
(52) U.S. Cl.
CPC .......... *G06F 16/212* (2019.01); *G06F 16/221* (2019.01); *G06F 16/2282* (2019.01); *G06F 16/258* (2019.01); *G06F 16/93* (2019.01)

(58) Field of Classification Search
CPC .... G06F 16/212; G06F 16/93; G06F 16/2282; G06F 16/258; G06F 16/221; G06F 16/25; G06F 16/254; G06F 8/427; G06F 40/177; Y10S 707/99942; Y10S 707/99943
USPC ........................................................ 707/756
See application file for complete search history.

(56) References Cited

U.S. PATENT DOCUMENTS

| 6,400,845 | B1 | 6/2002 | Volino | |
| 10,204,119 | B1* | 2/2019 | Ackner | G06F 3/0638 |
| 2009/0110279 | A1 | 4/2009 | Jain et al. | |
| 2011/0249905 | A1 | 10/2011 | Singh et al. | |
| 2019/0050445 | A1* | 2/2019 | Griffith | G06F 16/213 |

* cited by examiner

*Primary Examiner* — Evan Aspinwall
(74) *Attorney, Agent, or Firm* — Troutman Pepper Hamilton Sanders LLP (Rochester)

(57) ABSTRACT

A system and method of recognizing data in a table area from unstructured data includes a computer network, one or more processors communicatively coupled with the computer network, a storage location, and a graph-theoretic engine that receives an input stream of unstructured data associated. A table area is recognized from unstructured data, through one or more computer processors, from an input stream of unstructured data received over a computer network. One or more table headers associated with the detected one or more table areas are recognized. Further, one or more column delimiters associated with each column of the detected one or more table areas are determined. One or more tabular data associated with the detected one or more table areas are extracted. The extracted tabular data is mapped to one or more target schema to store onto a relational database.

20 Claims, 15 Drawing Sheets

Rio Tinto Coal Australia Pty Ltd
Locked Bag A9 5051
PARRAMATTA QLD 2124

Invoice Total  $648.81

| Material | Description | Supplied | Returned | UOM | Rate | Amount |
|---|---|---|---|---|---|---|
| 28/04/2014 | Del Ref:2003382804  PO: 3004708678  SO: 160 | | | | | |
| 1684 | FLUORO CARBONS R134A N SIZE AU116W | 3 | | CYL | $171.75 | $515.25 |
| | Refrigeration Surcharge | | | | | $65.00 |
| | Fluro Activity fee | | | | | $9.58 |
| | | | | | Sub Total | $589.83 |
| | Total Taxable Supplies | | | | | $589.83 |
| | GST | | | | | $58.98 |
| | Invoice Total | | | | | $648.81 |

| | A | B | C | D | E | F | G | H | I |
|---|---|---|---|---|---|---|---|---|---|
| 1 | Material | Description | Supplied | Returned | UOM | Rate | Amount | | |
| 2 | 29/04/2014 | Del Ref:200339284 SO: 160 | PO: 2004705579 | | | | | | |
| 3 | 155N | FLUOROCARBONS R134A N SIZE - AU11678 | | 3 | CYL | $171.75 | $515.25 | | |
| 4 | | Refrigeration Surcharge | | | | | $66.00 | | |
| 5 | | Fluro Activity fee | | | | | $8.58 | | |
| 6 | | | | | | Sub Total | $589.83 | | |

| Description | Quantity | Unit Price | Total Price | GST in Price |
|---|---|---|---|---|
| Imprint Large Charge Letters Regular | 34 | 1.40412 | 47.74 | 4.35 |
| Imprint Small Charge Letters Regular | 11 | 0.62000 | 6.82 | 0.62 |
| International Letters | 1 | 2.75000 | 2.75 | 0.00 |
| International Parcels Small | 2 | 35.15000 | 70.30 | 0.00 |
| Parcel Post Parcels > 500g (Basic Item) | 10 | 12.90500 | 129.05 | 11.73 |
| | | Total Supply | $256.66 | $16.70 |

INPUT

| Description | Quantity | Unit Price | Total Price | GST in Price |
|---|---|---|---|---|
| Imprint Large Charge Letters Regular | 34 | 1.40412 | 47.74 | 4.35 |
| Imprint Small Charge Letters Regular | 11 | 0.62 | 6.82 | 0.62 |
| International Letters | 1 | 2.75 | 2.75 | 0 |
| International Parcels Small | 2 | 35.15 | 70.3 | 0 |
| Parcel Post Parcels > 500g (Basic Item) | 10 | 12.905 | 129.05 | 11.73 |

OUTPUT

FIGURE 14

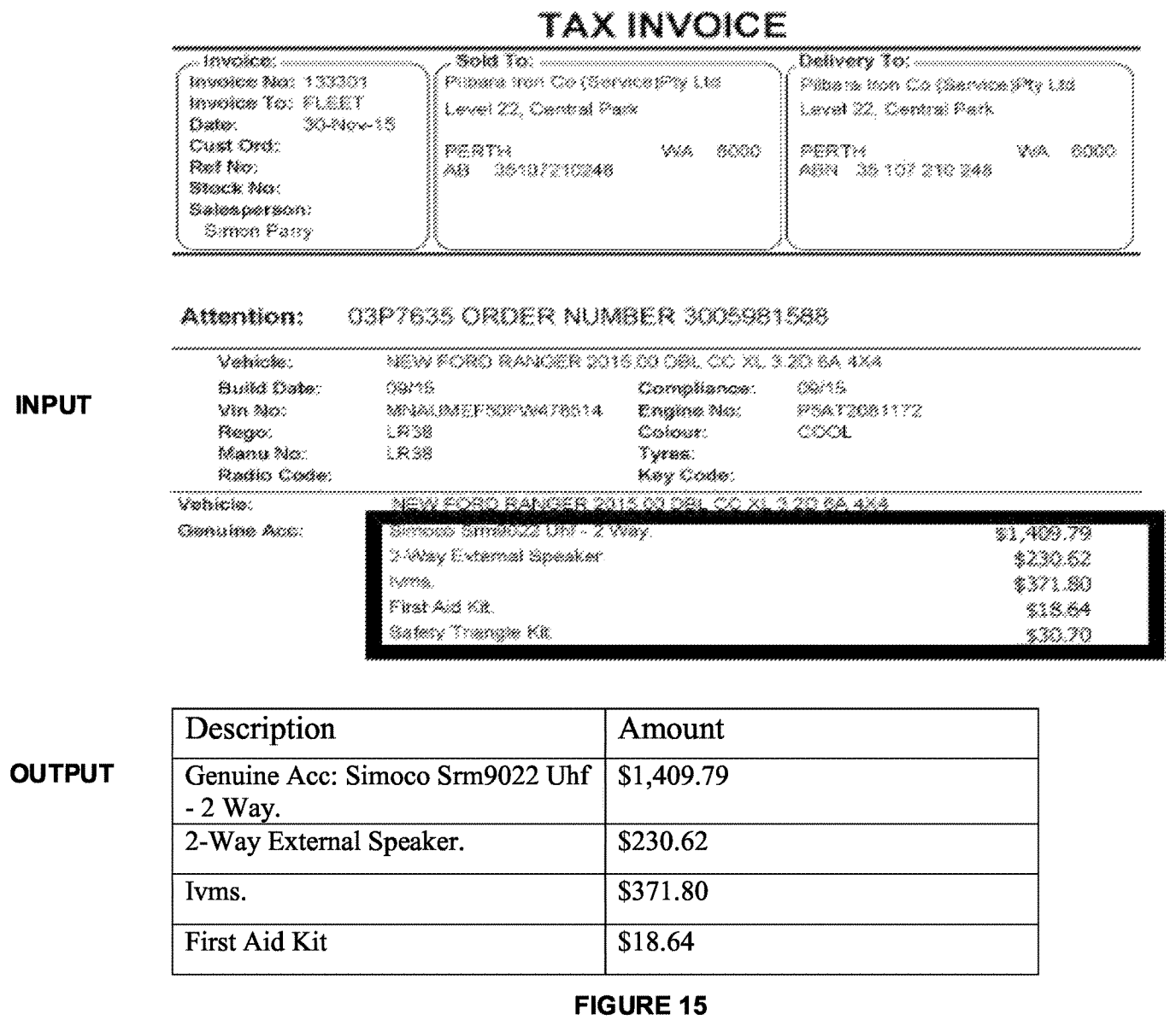

INPUT

| Description | Amount |
|---|---|
| Genuine Acc: Simoco Srm9022 Uhf - 2 Way. | $1,409.79 |
| 2-Way External Speaker. | $230.62 |
| Ivms. | $371.80 |
| First Aid Kit | $18.64 |

OUTPUT

FIGURE 15

SYSTEM AND METHOD OF RECOGNIZING DATA IN A TABLE AREA FROM UNSTRUCTURED DATA

FIELD OF TECHNOLOGY

The present field relates to a system, method and apparatus for recognizing data in a table area from unstructured data.

BACKGROUND

Tabular data extraction may include extracting of table title and line items. There may be multiple of noises that decrease an accuracy of extracting data. There have been different approaches in both academics and industries. However, due to a nature of invoices which may not be designed to be automatically processed by machines—none of current approaches so far is able to give a satisfied result. This is mainly due to unorganized way of placing the data in the document.

Current approaches for table data extraction are based on pre-defined layouts. For pre-defined layouts, OCR (Optical Character Recognition) tools provide capabilities to train the system with a set of similar layout documents. On the other hand, other tools provide capabilities to identify tables when specific bounding regions are provided as input. However, due to a nature of placing data in certain documents (e.g., invoices), companies follow separate (undefined) format for each document typing. Thus, pre-defined layout based algorithms may not work for any table residing in a document image and PDFs. Certain heuristics may also be followed that incorporate application of business-specific rules as well as complex processing. However heuristic approach performance may be limited based on the trained samples.

Further, some previous approaches used geometric features such as pixel information, horizontal and vertical lines, and character streams to determine a logical structure of a table. These approaches may be developed using image processing operations such as segmentation of image, line detection, etc. These approaches are well suited for well-defined table layouts, that is, cell data is presented exactly a cross section of row and column with visual cues such as vertical and horizontal lines. Moreover, a table data extracted may be in two-dimensional format.

SUMMARY

Disclosed are a system, method and apparatus of recognizing data in a table area from unstructured data.

In one aspect, a method of recognizing data in a table area from unstructured data, through one or more computer processors, from an input stream of unstructured data received over a computer network and one or more table headers associated with the detected one or more table areas that are recognized. Further, determining, through one or more computer processors, one or more column delimiters associated with each column of the detected one or more table areas and extracting one or more tabular data associated with the detected one or more table areas. Still further, mapping the extracted tabular data to one or more target schema to store onto a relational database.

In another aspect, a system of recognizing data in a table area from unstructured data includes a computer network, one or more processors communicatively coupled with the computer network, a storage location, and a graph-theoretic engine that receives a input stream of unstructured data associated with the storage location. A table area is recognized from unstructured data, through one or more computer processors, from an input stream of unstructured data received over a computer network. One or more table headers associated with the detected one or more table areas are recognized. Further, through one or more computer processors, one or more column delimiters associated with each column of the detected one or more table areas are determined. Still further, one or more tabular data associated with the detected one or more table areas is extracted. The extracted tabular data is mapped to one or more target schema to store onto a relational database.

In yet another aspect, an apparatus of recognizing data in a table area from unstructured data includes a computer network, one or more processors communicatively coupled with the computer network, a storage location, and a graph-theoretic engine that receives a input stream of unstructured data associated with the storage location. A table area is recognized from unstructured data includes one or more table areas that are detected, through one or more computer processors, from an input stream of unstructured data received over a computer network. One or more table headers associated with the detected one or more table areas are recognized. Further, through one or more computer processors, one or more column delimiters associated with each column of the detected one or more table areas are determined. Still further, one or more tabular data associated with the detected one or more table areas is extracted. The extracted tabular data is mapped to one or more target schema to store onto a relational database.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 10 shows data extracted from sample image document, according to one or more embodiments.

FIG. 11 shows outlier detection, according to one or more embodiments.

FIGS. 14 and 15 depict sample inputs and outputs of the graph theoretic engine, according to one or more embodiments.

Figure 1:
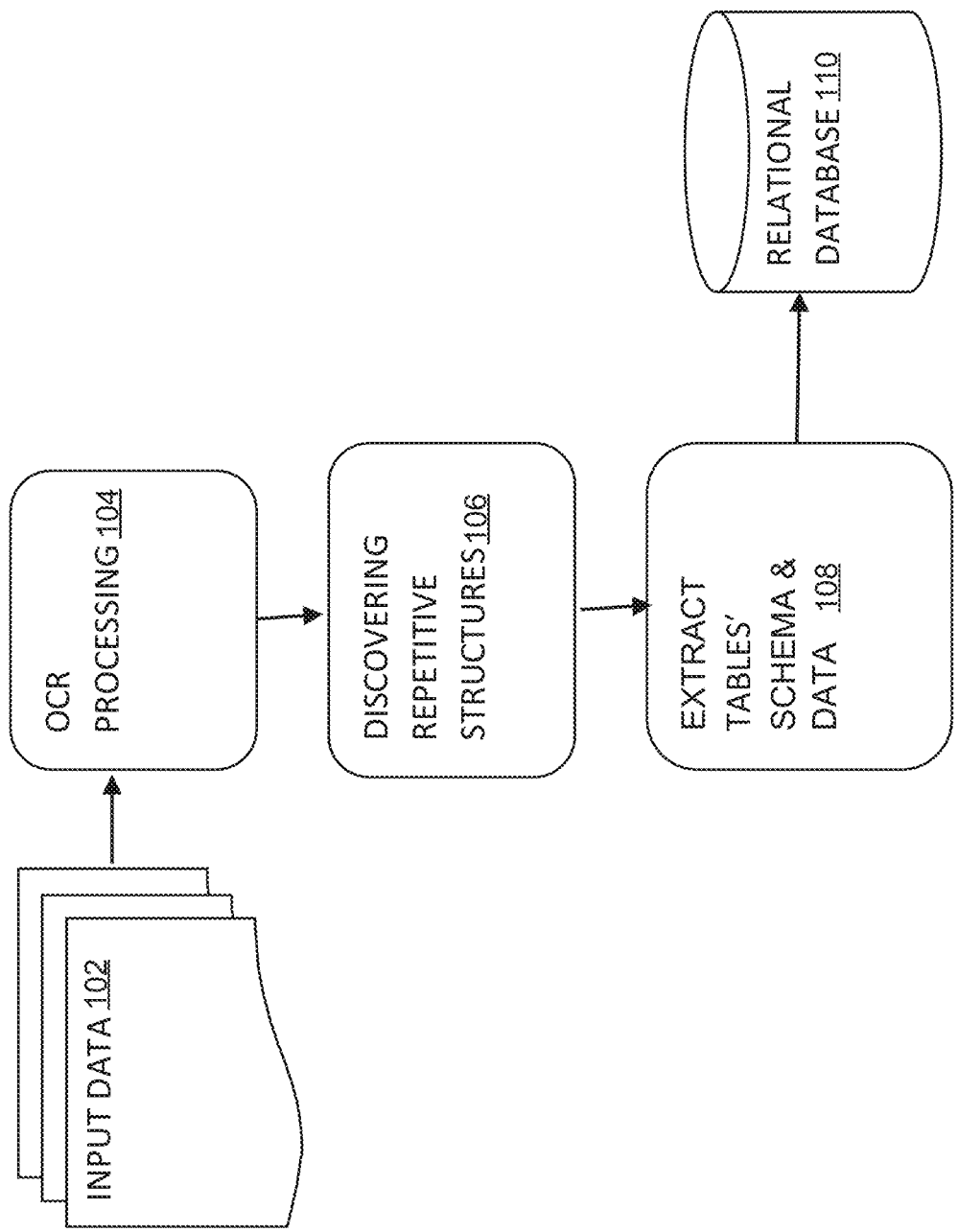
FIG. 1 is a high-level flow of a system of recognizing table data in an unstructured data stream, according to one or more embodiments.

Other features of the present embodiments will be apparent from the accompanying drawings and from the detailed description that follows.

DETAILED DESCRIPTION

Example embodiments, as described below, may be used to provide a method, an apparatus and/or a system of recognizing data in a table area from unstructured data. Although the present embodiments have been described with reference to specific example embodiments, it will be evident that various modifications and changes may be made to these embodiments without departing from the broader spirit and scope of the various embodiments.

In one or more embodiments, a text pertaining to a document may reside within a table data, but may not related to specific columns. Such text data that may not be related to specific columns may be considered as outliers. A system may detect outliers within the table with a help of one or more of a graph-theoretic engine or column-specific libraries. The system may also discover a table header and a column header that may be split into multiple sub-columns. The data structure associated with the system may be graph. The graph data structure may allow for multi-dimensional table data, which may be represented in a two-dimensional physical layout associated with a document image AND/OR PDFs, to also be extracted.

Tabular data extraction has been a problem for multiple years. Since invoices are not initially designed for automatic processing, a performance of automation may be bad to be commercialized. Because of a volume of outliers (e.g., vendor-specific cases) and a varied representation of tabular data in a random form, no technology has been able to solve all cases. A major differentiation against previous technologies may be provided by an improvement in performance through the graph-theoretic engine.

In one or more embodiments, graph-theoretic engine may be designated to solve alignment problems, so that an extracted table may be readable and stored into a (relational) database. Through the graph-theoretic engine, the table is abstracted into a graph, and multi-facet logics may be applied. The extracted table may be passed over through further processing.

In one or more embodiments, converting unstructured table data in documents into structured (relational) data may include one or more of detecting or recognizing a table(s) in a document (Table Regions), recognizing a table header, determining column boundaries (alignment of cell values to a column), extracting tabular data from document (rows and columns) and mapping to target schema.

In one or more embodiments, to analyze an invoice, positions of elements may be processed. Position information may indicate an importance of a line. If a line takes up the whole width, then the line may be a major information of the invoice. Further, in understanding content of the invoice, limited vocabulary may be used in invoices. A text analytic method such as Fuzzy String Match may be applied to recognize key fields. Once raw information is extracted, table structure may come into play. In general, a table may consist of rows and columns. A good line may be defined as a line with maximum empty cells AND/OR alignment information.

In one or more embodiments, methods and systems disclosed herein may be applied for data extraction from tables that do not have explicit boundaries (horizontal and vertical lines).

In one or more embodiments, a graph-theoretic engine may have two characteristics. Firstly, through a graph, one or more cells in a table may be logically linked. Whenever a modification is made, linking among cells may be considered. Secondly, the theoretic graph engine has a potential to use outside information. For example, if previous classification indicates a table start, a better performance may be achieved.

In one or more embodiments, terminology associated with a table area may vary from vendor to vendor. Thus, external libraries may be necessary to be defined. A vendor-specific library may be learned from previous manual works AND/OR received as input manually. The vendor-specific library may improve a performance of results associated with the theoretic graph engine.

The external libraries may include multiple details such as Position and size information, sematic information, and format information. Position and size information may indicate large characters are first captured AND/OR top/bottom ones are first captured. Sematic information may further include understanding a title, recognizing a header, and understanding a meaning of a column AND/OR row. Format information may further include extractable lines that may be based on title and recognizing tabular lines. Further, format information may also include details usage of sematic/format information to deal with outliers (wrapped description).

In one or more embodiments, graph-theoretic engine operations may include one or more of graph creation, connected components determination, graph stabilization, or neighborhood analysis. The graph creation may include node enumeration AND/OR identifying cell boundaries. The connected components determination may include algorithms to find connectedness based on node merge and node split. The graph stabilization may include keeping the row-column values in matrix form AND/OR Null node creation, if required. The neighborhood analysis may include Relationship finding AND/OR finding an appropriate parent or sibling.

FIG. 1 is a high level flow of a system of recognizing table data in an unstructured data stream, according to one or more embodiments. In one or more embodiments, an input data 102 may be processed by an optical character recognition engine 104 to discover repetitive structures 106 in the input data 102. Table schema and data associated with a table data of the input data may be extracted 108 and stored on a relational database 110.

Figure 2:
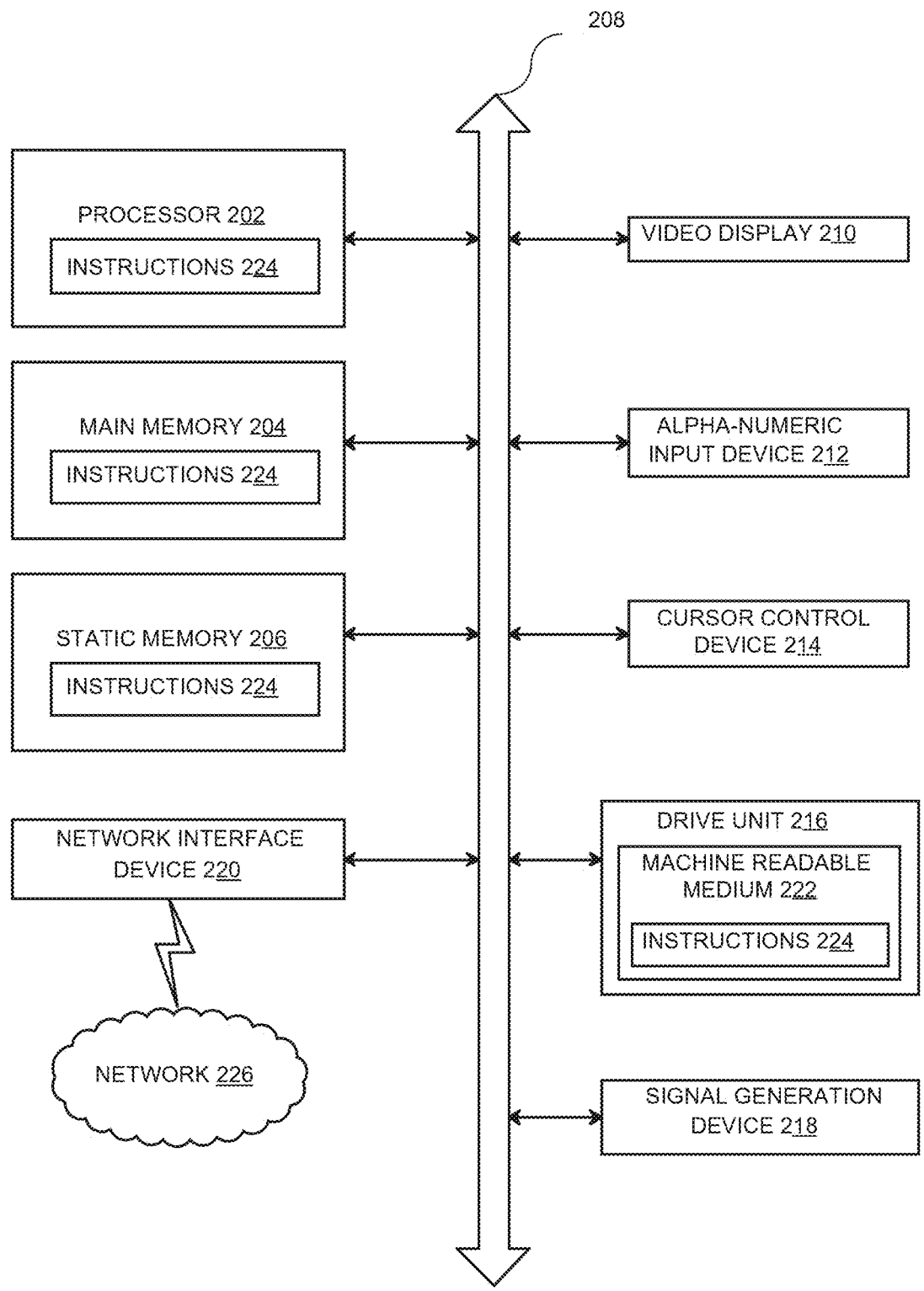
FIG. 2 is a diagrammatic representation of a data processing system capable of processing a set of instructions to perform any one or more of the methodologies herein, according to one embodiment.

FIG. 2 is a diagrammatic representation of a data processing system capable of processing a set of instructions to perform any one or more of the methodologies herein, according to an example embodiment. FIG. 2 shows a diagrammatic representation of machine in the example form of a computer system 200 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, and or as a peer machine in a peer-to-peer (or distributed) network environment. The machine may be a personal-computer (PC), a tablet PC, a cellular telephone, a web appliance, a network router, switch and or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system includes a processor 202 (e.g., a central processing unit (CPU) a graphics processing unit (GPU) and/or both), a main memory 204 and a static memory 206, which communicate with each other via a bus 208. The computer system 200 may further include a video display unit 210 (e.g., a liquid crystal displays (LCD) and/or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions 224 (e.g., software) embodying any one or more of the methodologies and/or functions described herein. The instructions 224 may also reside, completely and/or at least partially, within the main memory 204 and/or within the processor 202 during execution thereof by the computer system 200, the main memory 204 and the processor 202 also constituting machine-readable media.

The instructions 224 may further be transmitted and/or received over a network 226 via the network interface device 220. While the machine-readable medium 222 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and the like. The term "machine-readable medium" does not refer to signals.

Figure 3:
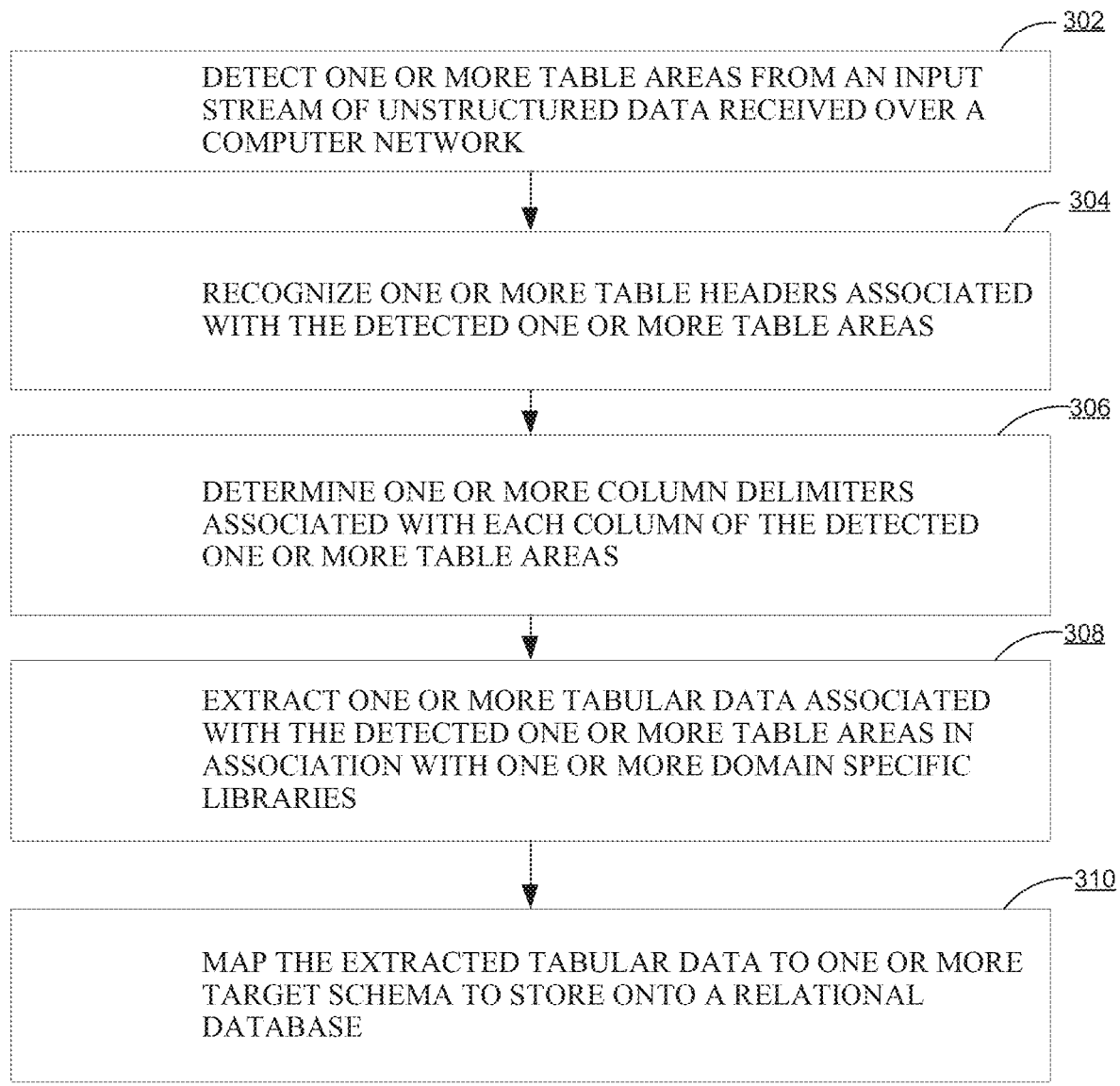
FIG. 3 is a process flow diagram detailing the operations of a system and method of recognizing data in a table area from unstructured data, according to one or more embodiments.

FIG. 3 is a process flow diagram detailing the operations of a system and method of recognizing data in a table area from unstructured data, according to one or more embodiments. A method of recognizing data in a table area from unstructured data includes detecting, through a processor, one or more table areas from an input stream of unstructured data received over a computer network 302 and recognizing, through one or more processors, one or more table headers associated with the detected one or more table areas 304. Further, one or more column delimiters associated with each column of the detected one or more table areas is determined 306. One or more tabular data associated with the detected one or more table areas is extracted in association with one or more domain specific libraries 308 and the extracted tabular data is mapped to one or more target schema to store onto a relational database 310.

In one or more embodiments, recognizing data in a table area may include one or more of position-based, text-based, or structure-based sub-approaches. Besides regular-formatted tables, a graph-theoretic model is able to solve many other cases, for example, wrapped titles and misaligned lines. Additionally, through libraries which specify a terminology that a vendor uses, the performance may be improved.

In one or more embodiments, unstructured data (or unstructured information) may be information that either does not have a pre-defined data model AND/OR is not organized in a pre-defined manner. Unstructured information may be typically text-heavy, but may contain data such as dates, numbers, figures, pictures/images and facts as well.

Further, unstructured data may include one or more of data AND/OR documents that have (a). a structure, while not formally defined, may still be implied, (b). data with partial form of structure may still be characterized as unstructured if its structure is not helpful for a processing task, (c). unstructured data may have some structure (semi-structured) AND/OR even be highly structured but in ways that are unanticipated or unannounced.

In one or more embodiments, documents such as images and PDFs are unstructured documents. However, certain documents' (such as invoices) contents possess structured layouts where data (e.g., Line items) may be represented as tables. Tables may present data in a structurally defined manner like two—AND/OR multi-dimensional format and represent the data in a more condensed form.

In one or more embodiments, a graphic model may represent raw table extracted with misalignment and possible errors. The graphic model, on further processing may be added to produce a regularized table.

In previous approaches which were mostly trial-and-error based for table extraction from image documents (such as invoices, credit notes, appraisal forms etc.). One thought provoking approach may be to find repeated structure in invoices AND/OR receipts. Through graphic information, table recognition may be based on repeated patterns shown in an invoice such as receipts from supermarkets.

In an invoice, there may be always multiple repeated structures that may potentially be recognized. Such kind of documents typically contain multiple tables, different layouts, cell types, different table elements, etc. There are sometimes missing columns, overlapping text across columns and rows, misalignment, etc. More importantly, previous approaches failed to recognize titles, which may be used for formatting and validation.

Further, to achieve automatic table extraction from image documents such as invoices, there may be no universal metadata specification for tables, exact identification of column labels may be difficult, no generic approaches are viable for image table data extraction and previous approaches are highly tailored to specific instances of image tables pertaining to small domains.

Figure 4:
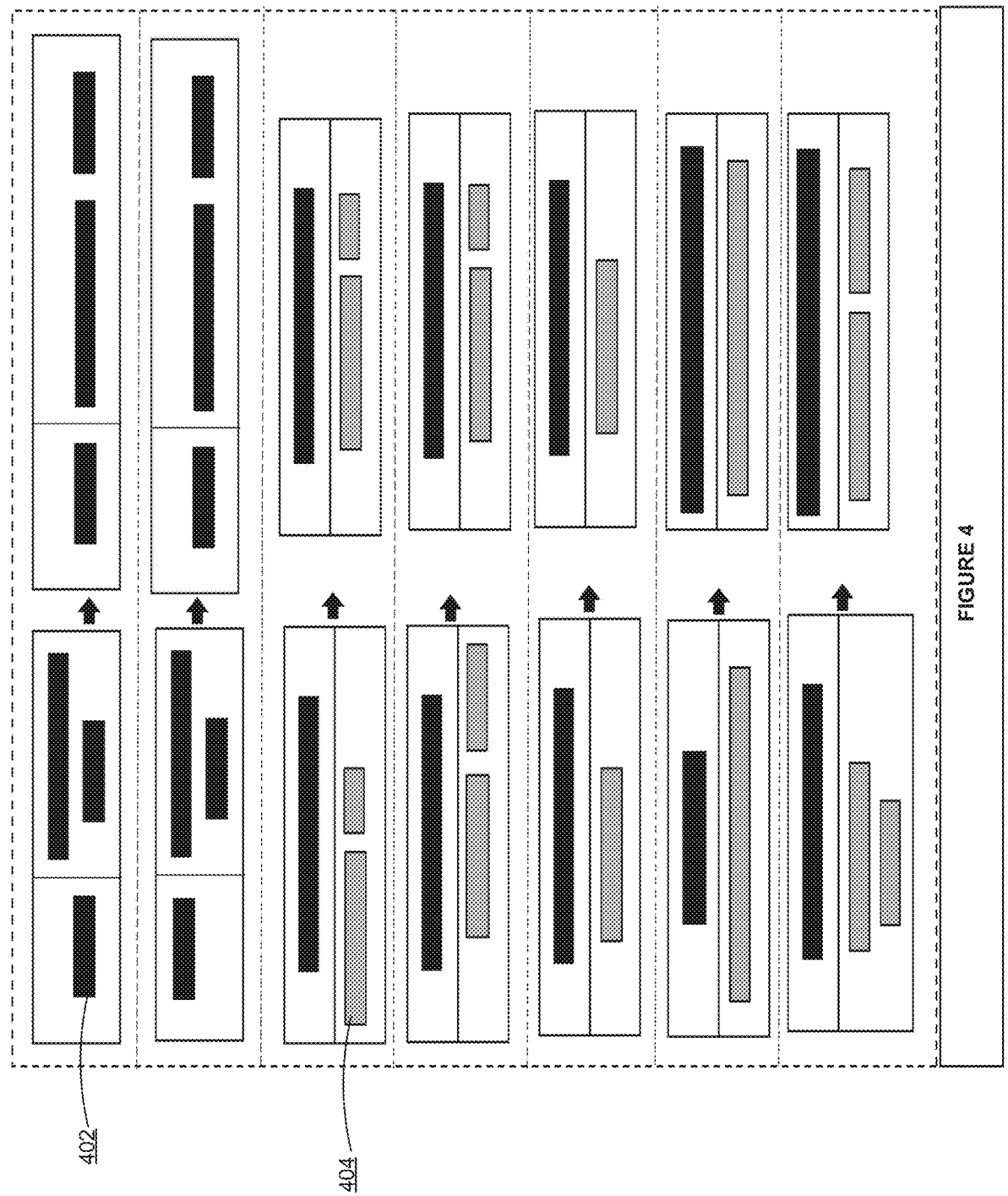
FIG. 4 is a depiction of vertical and horizontal alignment of text in various scenarios, according to one or more embodiments.

FIG. 4 is a depiction of vertical and horizontal alignment of text in various scenarios, according to one or more embodiments. Column header is indicated by the darker filled blocks 402 and column value indicated by the lighter filled blocks 404.

Figure 5:
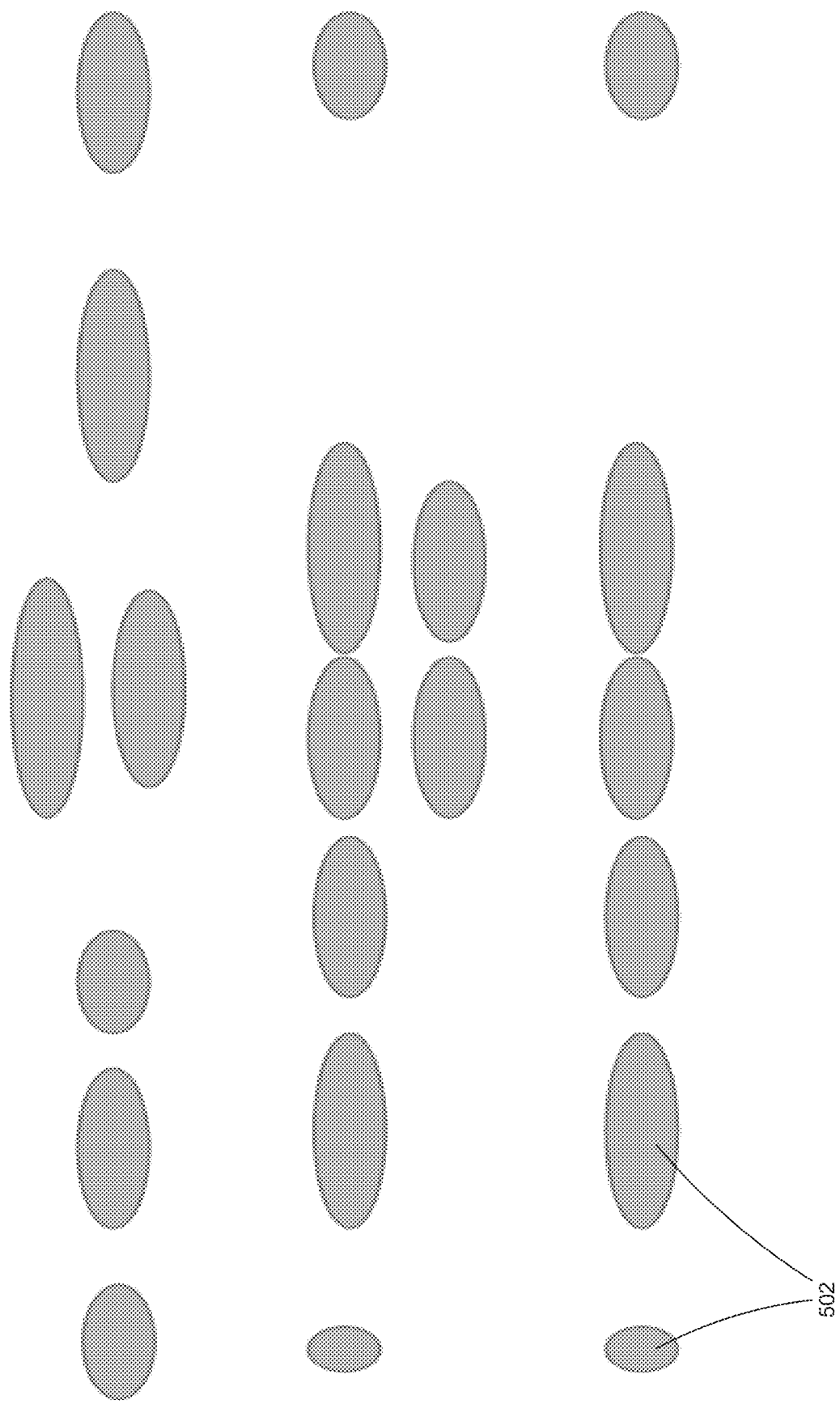
FIG. 5 is a depiction of a step in a graph-theoretic engine, according to one or more embodiments.

FIG. 5 is a depiction of a step in a graph-theoretic engine, according to one or more embodiments. Each word 502 may be considered as a node in the graph-theoretic engine.

Figure 6:
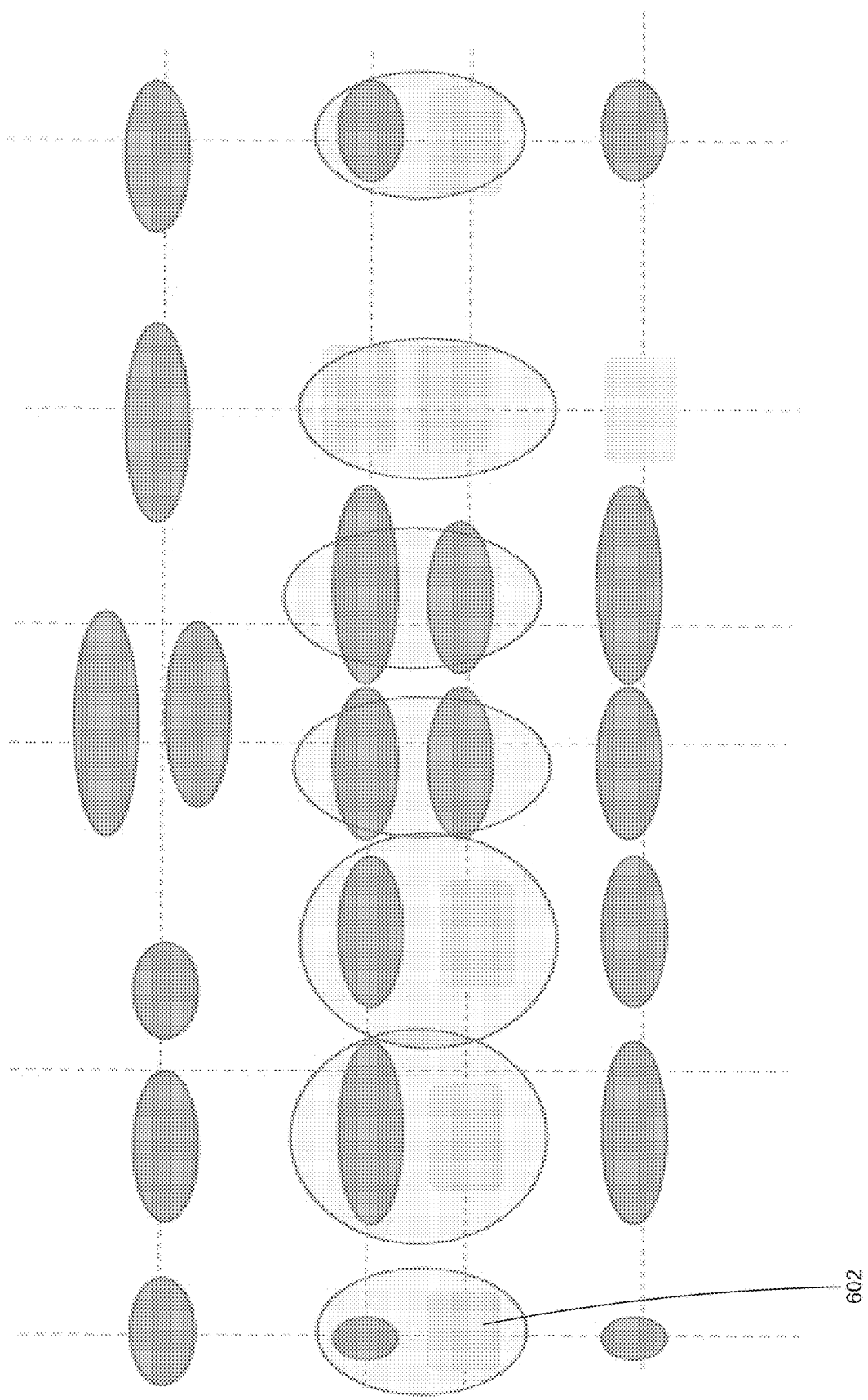
FIG. 6 shows adding of empty nodes to make the structure a matrix in a graph-theoretic engine, according to one or more embodiments.

FIG. 6 shows adding of empty nodes 602 to make the structure such a matrix in a graph-theoretic engine, according to one or more embodiments.

Figure 7:
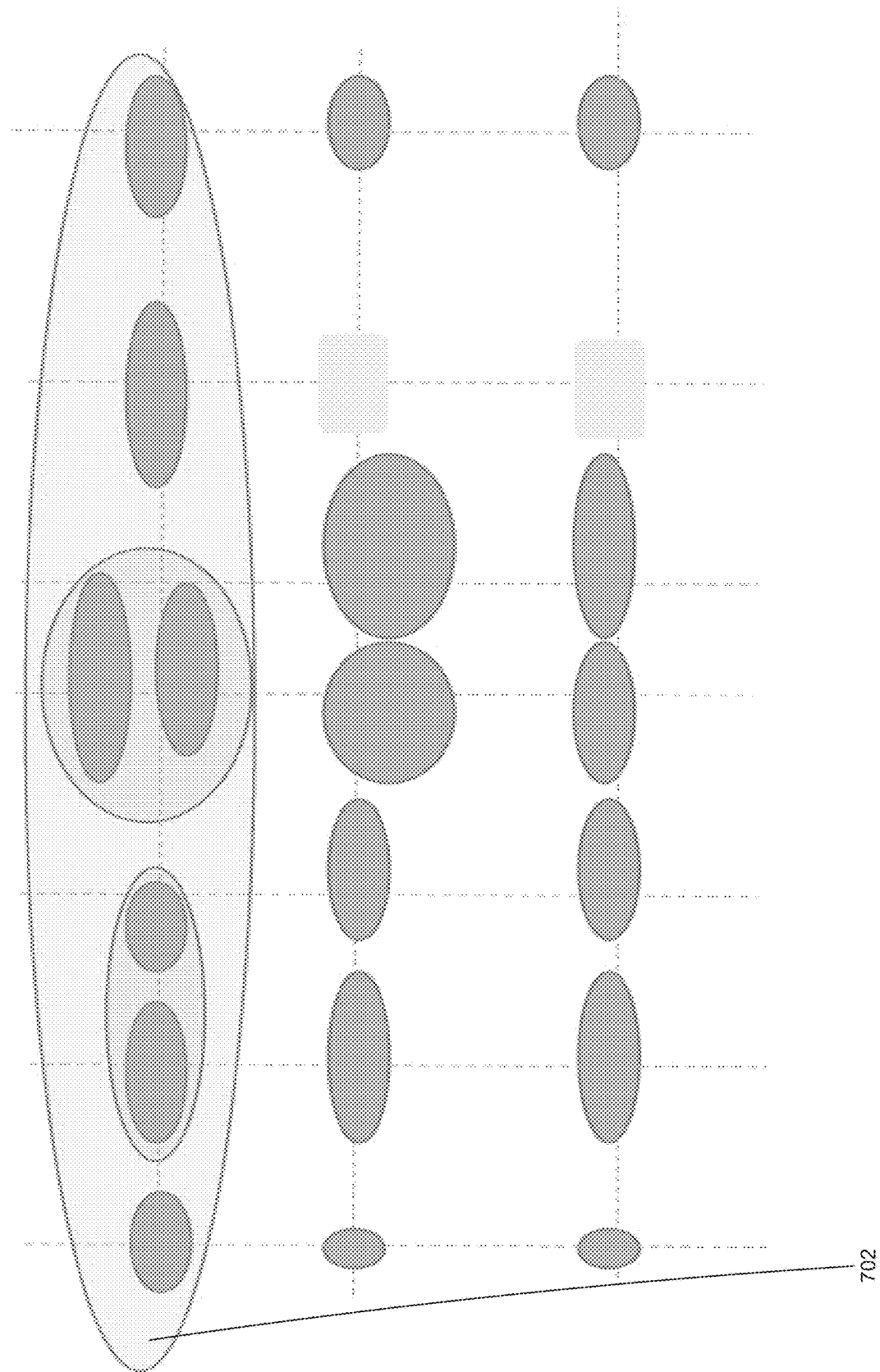
FIG. 7 shows node merging and node splitting, according to one or more embodiments.

FIG. 7 shows node merging and node splitting 702 to recognize the cell values, according to one or more embodiments.

Figure 8:
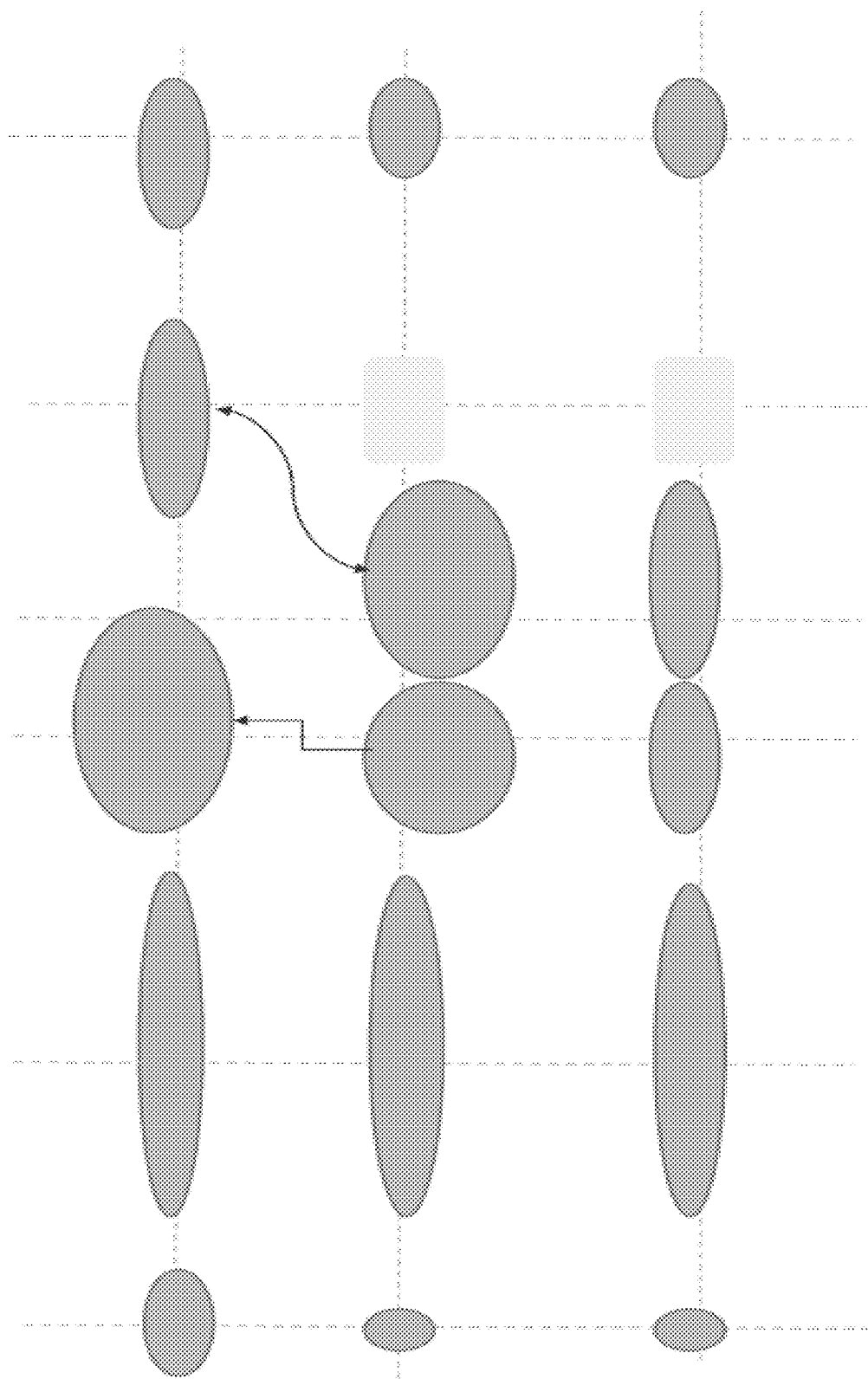
FIG. 8 shows alignment of nodes by content and graph specific operations, according to one or more embodiments.

FIG. 8 shows alignment of nodes by content and graph specific operations, according to one or more embodiments.

Figure 9:
FIG. 9 shows sample image document with a table structure, according to one or more embodiments.

FIG. 9 shows sample image document with a table structure, according to one or more embodiments.

FIG. 10 shows data extracted from sample image document, according to one or more embodiments.

Figure 11:
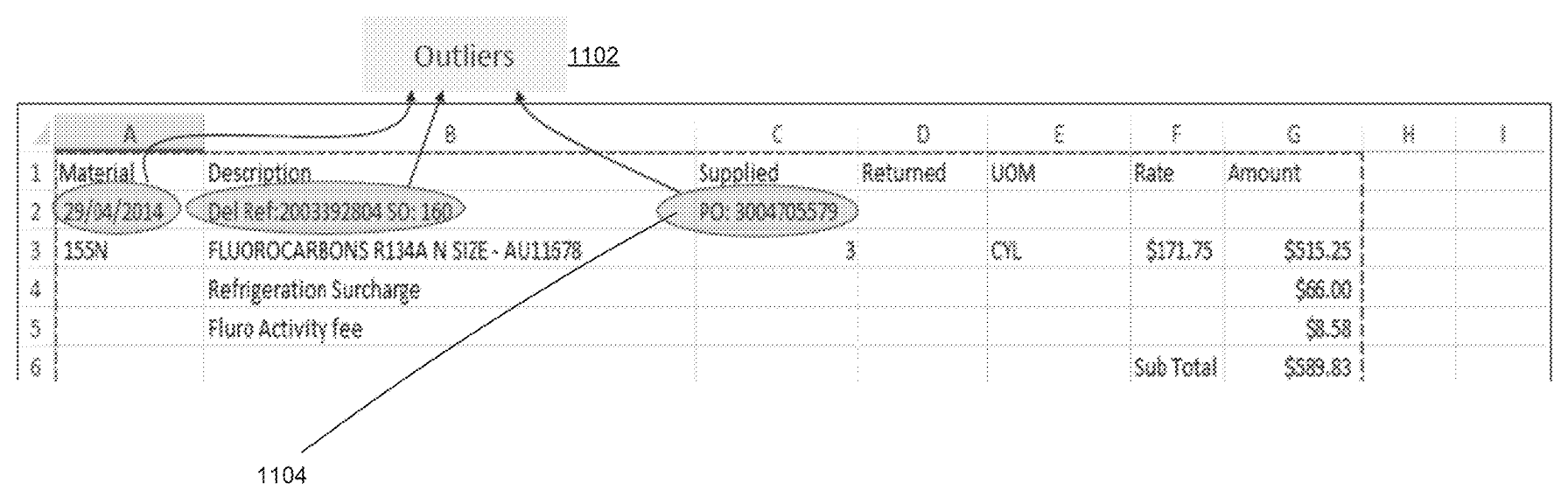

FIG. 11 shows outlier detection, according to one or more embodiments. Outliers 1102 may be non-tabular data such as additional text. For example, PO Number 1104 may be included as part of a table. Graph-theoretic engine may discover number of columns and arrange a data to fit into a number of columns through various operations such as node merge and node split, the outliers 1102 may be determined by defining heuristics like a row that has not met minimum number of column values.

Figure 12:
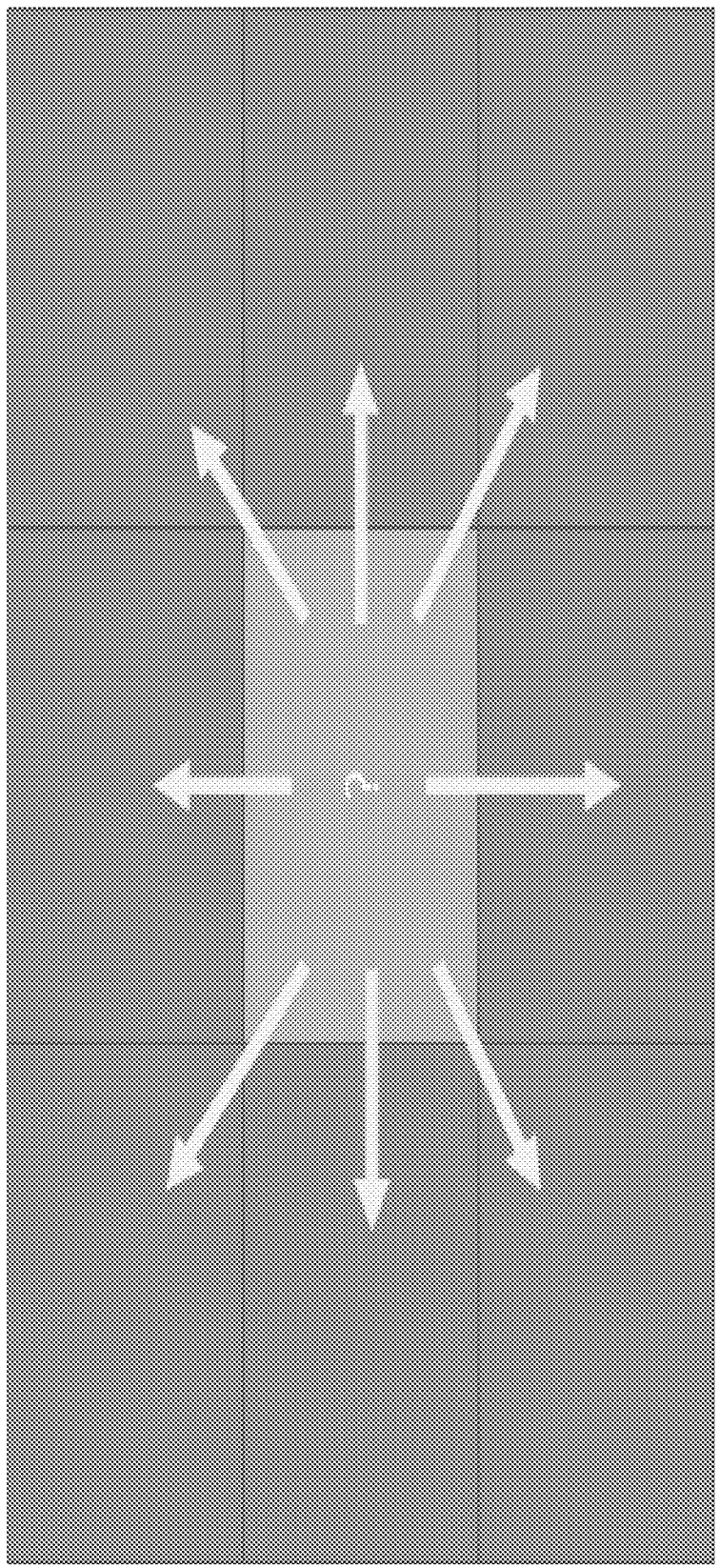
FIG. 12 shows neighborhood analysis, according to one or more embodiments.

FIG. 12 shows neighborhood analysis, according to one or more embodiments. The neighborhood analysis may be based one or more of text position in image or semantics including data type, content, similarity, relevance etc.

In one or more embodiments, identifying a table header that may span multiple rows, that is, identifying column boundaries when a column splits into multiple sub-columns includes in a first run a graph-theoretic engine that may identify potential header lines and determine an actual header line. For example, a description may be high priority {description, 1} and more number of matching columns with column vocabulary, etc. Further, check if header by looking at next two lines down and up, and in a last step, merging a header line items, if there is more than one line.

In one or more embodiments, Optimal Character Recognition (OCR) is a method of extracting text from unstructured documents like images or pdfs. An OCR output of such unstructured documents may be unstructured or structured. Examples of OCR engines may be MODI, Dokustar, etc. MODI (Microsoft Office Document Imaging) gives unformatted raw text that may be printed on the document as output. Dokustar may give semi-structured output in the form of xml. The xml may have a structure of a document, embedded with a data from the document. The algorithm may use the xml output of an OCR engine.

Table 1 depicts meanings of notations used henceforth:

TABLE 1

| Notations used | |
|---|---|
| $\mathcal{T}$ - | Table |
| $\mathcal{P}$ - | Set of pages of document |
| $\mathcal{L}$ - | Set of lines of a page |
| $\mathcal{R}$ - | Set of rows of a table |
| $\mathcal{C}$ - | Set of columns of a table |
| $c$ - | Cells of a row/line |
| $\mathcal{H}$ - | Headers of the relational table |
| $\mathcal{O}$ - | OCR output |
| $\mathcal{K}$ - | Domain Knowledge |
| $\mathcal{J}$ - | set of line indices |

Data Structuring Algorithm: Getting structured output from OCR semi-structured output may be performed using a data structuring algorithm and engine.

Input: OCR output—Semi-structured Xml $\mathcal{O}$
Output: Set of lines on the page $\mathcal{L}$ Description: A Sample Node on $\mathcal{O}$ may look like:

```
<data>
  <value>Text</value>
  <rectangle>Coordinate(x,y,h,w)</rectangle>
</data>
``` wherein text may be a text printed on an image and for Coordinates x,y,h,w—(x,y) may be a rectangle origin and (h,w) may be a rectangle dimensions—height and width. The OCR output may be still considered as semi-structured since, one line appears as multiple nodes in an xml output with each node containing segments of an actual line.

Using the structure of the image, preserved in Coordinate, the algorithm may constructs the actual lines as available in the document. The algorithm may construct the actual lines by linking multiple nodes into a single node. Once the list of adjoining nodes may be identified, text from all the nodes may be merged into a single line separated by space and a complete zone of the line is reconstructed. The algorithm may be semi-supervised. A user may provide a threshold value that specifies a permissible limit for linking nodes.

In one or more embodiments, the algorithm steps may include:
1. Define Node_Merge_Criteria as overlap between the rectangles of chosen two nodes is above the merge threshold OR y-coordinates of the rectangles are very close
2. For all the nodes in $\mathcal{O}$
   a. Pick the first node, say N1.
   b. Repeat the steps until the Node_Merge_Criteria fails
      i. Pick the subsequent node N2. Check the Node_Merge_Criteria between N1 and N2.
      ii. If the condition satisfies, link N1 and N2 to form LL.
         1. Merge the Coordinate of N1 and N2, update N1.
      iii. If the condition does not satisfy, get the text from all nodes in LL. Create a line l, add the combined text to l. Construct the union of Coordinate corresponding to all nodes in LL, add this information to l. Add l to $\mathcal{L}$. Update N1 with subsequent node. Go to b.

Table Creation Algorithm

Input of table creation algorithm: OCR output of an Unstructured Document after preprocessing, $\mathcal{L}$.

Output of the table creation algorithm: Relational Table.

The output of the algorithm may be to identify if there is a table in the unstructured document. There may be one or more approaches for identifying table presence such as Top Down approach and Bottom Up approach.

In Top Down approach, an identification system may use domain knowledge and structural knowledge to identify a table.

Domain Knowledge may be a set of keywords/phrases which are specific to a document type. Examples of document types may include invoices, explanation of benefits, loan documents, etc. Each document type may have a domain specific keyword like for an invoice document, keywords may be Description, Material Code, Line Amount, Tax, Discount. For a benefits document, keywords may be patient liability, treatment, service code, service description etc.

In the top-down approach, starting from a beginning of a page, the algorithm parses each line to identify a table header. Systematically, the table header may have more than two domain specific keywords in a line. So, the algorithm identifies if there is a line which has more than two domain specific keywords. The identified line may form the header of the table. From all the lines that follow the header line, there may be tabular lines and page footer. The Lines that may be close to the table header form tabular lines. The lines which may be significantly far, form the page footer and are not processed.

To identify if the domain keywords are present in the given line, a similarity score of words in the line with the domain keywords is computed. A score of a line is the count of number of domain keywords present in a given line.

Algorithm Steps:

Table Header Identification: For each line l in $\mathcal{L}$, compute score of e with respect to domain knowledge, $\mathcal{K}$. If acceptable score, add l to set of header lines, $\mathcal{H}$. Add index of l to index set, $\mathcal{J}$.

Table Header Formation: In $\mathcal{J}$ identify a longest sequence of consecutive integers $\mathcal{S}$. Pick l in $\mathcal{H}$, corresponding to the longest sequence $\mathcal{S}$ and invoke the TitleMerger to merge all lines in $\mathcal{H}$ to form the table header H. Let l be the largest index in $\mathcal{S}$.

Table Formation: From index l+1, align each l in $\mathcal{P}$ to H using LineAligner.

Graph Formation: Each cell in H forms a header node in the graph $\mathcal{G}$. Each cell in a tabular line forms a data node linked to the header node directly or through the data node's vertical predecessor. Thus, an undirected graph may get complete header nodes and sparse data nodes. Null data nodes may be inserted to get breadth-wise complete data nodes.

Data Curation: Use Table_Data_Curation to correctly align the data in the table.

Column Delimiting Techniques

In one or more embodiments, after identifying a header line may be to identify column headers. In defining a data type of a column and in data cleansing. Column header delimitation may happen in one or more ways such as structural and domain specific. In structural delimitation, two column headers may be separated by significant gap for readability. However, the structural approach fails when the column header is closely knit. Domain specific structural delimitation may be to identify the column headers. Domain specific structural delimitation may be a supervised learning approach, involving accurate domain specific column header information.

In one or more embodiments, structural—spatial delimiters: Two words in a line which may be separated by significant amount of space form two different columns in the header.

Domain Delimiters: Each word identified in the header may be checked against a domain specific column header list to get score against possible variants and then to identify the actual column header.

In one or more embodiments, column delimiting may be followed by a T approach. After columns may be formed using one or more of the spatial delimiter or domain delimiter, words in one column are grouped with words from a column to the left and to the right and from a successor cell (cell in the same position in the next line). Two and three word combination of the words may be formed. For each combination, score may be computed with respect to $\mathcal{K}$. Based on the score, a column value is identified. Variants in the approach may be—left priority, right priority and center priority. In left priority, word combinations may form by fixing the left most words.

In one or more embodiments, tabular data is the data in the detected table area. Domain specific library may include one or more of column vocabulary or rules to determine one or more column names. One or more outliers associated with the one tabular data may be removed. The outliers may be one or more of a document related text, watermark, or noise. The unstructured data is one or more of a free form document, digitized document, or document without a predefined layout. The digitized document may be one or more of an image file or PDF.

TitleMerger Algorithm:

Input: Set of lines $\mathcal{H}$

Output: Title line H

Steps:
1. Based on a chosen column-delimiter, identify column values for a first line. Identify a Coordinate corresponding to each column.
2. For every other line in H, for every word, identify a column whose Coordinate has maximum overlap with a word zone, add the word to the column.

LineAligner Algorithm

Input: Title Line, $\lfloor = \{l \in \mathcal{L} \setminus \mathcal{H}\}$ (Set of lines in $\mathcal{P}$ that come after lines contained in $\mathcal{H}$) and Output: Relational table $\mathcal{T}$.

Steps:
1. Create a row $r$ in $\mathcal{T}$, based on columns identified in H.
2. For each line l in $\lfloor$, for each word in l, identify a column c in H whose zone has maximum overlap with the word zone, add the word to the respective cell in $r$.

Table_Data_Curation Algorithm

Figure 13:
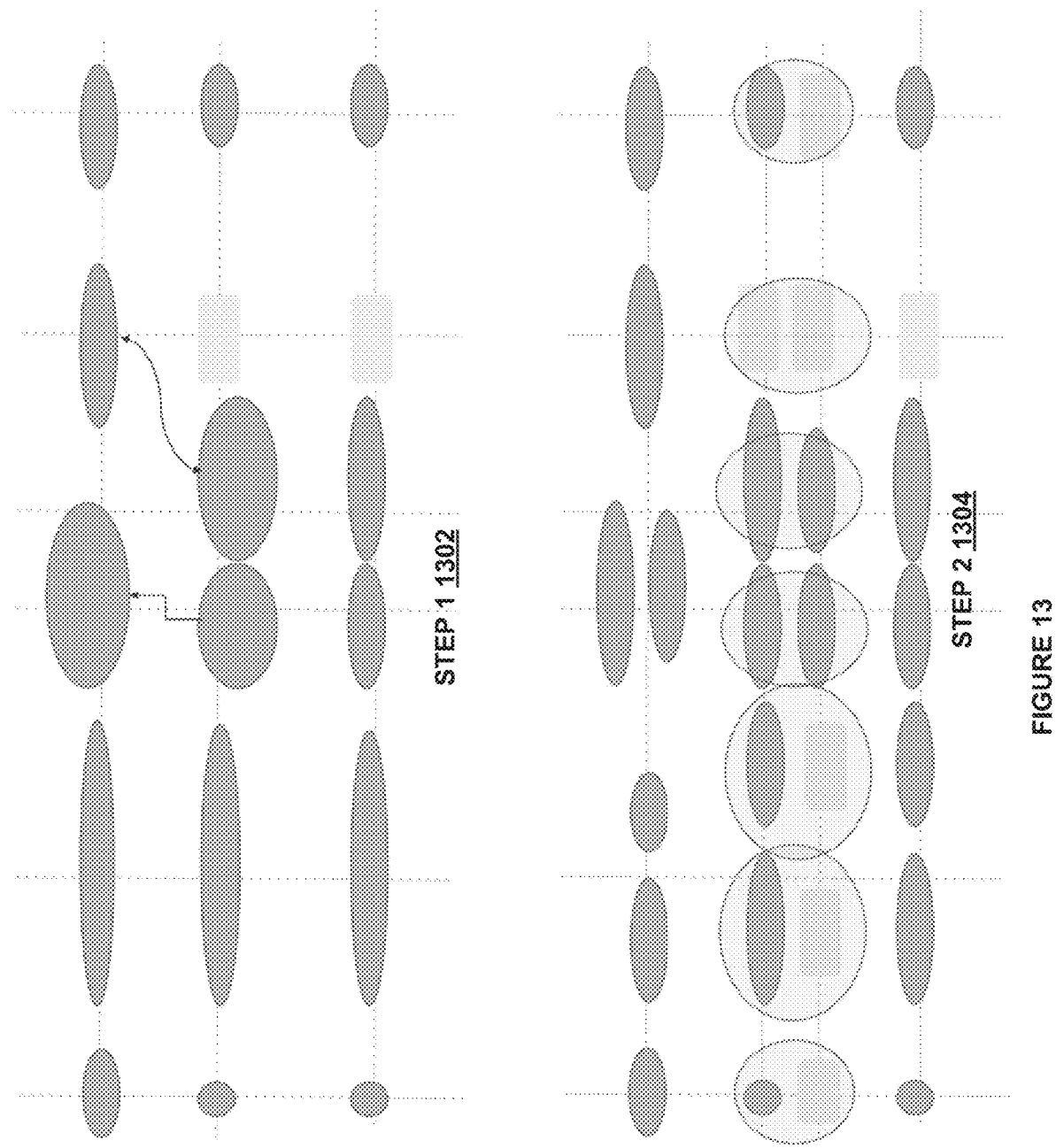
FIG. 13 depicts the steps involved in a table data curation, according to one or more embodiments.

FIG. 13 depicts the steps involved in a table data curation, according to one or more embodiments.

Input: Table graph output $\mathcal{G}$.

Output: Table graph $\mathcal{G}$ with data accurately positioned.

The significance of using a graph to represent a table is an ease of node traversals. Well-formed graphs allow flexible traversal amongst data nodes. In connected graphs, where each node may have neighbors in four directions, it is easy to traverse to the diagonal neighbor in two steps.

As part of domain knowledge, the data type may be assumed corresponding to different column headers.

Steps:
1. Data Traversal and Data Alignment 1302:
    A traversal of the data nodes may be done. For each data node NODE,
    a. If a data type of the node matches with a column header, move horizontally to a next data node.
    b. If the data type of the node does not match the data type of column header, split contents of the data node (CNode_1, CNode_2, and so on), if multiple data values may be present in a data node and column type expects a single value. Get immediate neighbors to the left LEFT and to the right RIGHT
       If LEFT is null and data type of CNode_1 matches with CH_LEFT, copy contents of the CNode_1 to LEFT. If LEFT can hold multiple data values, repeat the step till Data type (CNode_i) mismatches with that of CH_LEFT.
       Else LEFT can hold a single value, move CNode_1 to left.
          If CNode_2 matches the column header type, retain CNode_2 and move the other contents to RIGHT.

If CNode_2 does not match the column header type, move the contents to RIGHT.

If LEFT is not null, and if CNode_1 matches the column header type, retain CNode_1 and move the other contents to RIGHT.

Else If CNode_1 does not match the column header type, move the contents to RIGHT.

2. Data Completion 1304:
   a. If a row anchor (a column that makes a row unique) is not available,
      i. For all non-null data nodes in a row, check if an immediate vertical predecessor of the data node is null OR of the same data type; if yes, copy contents of all data nodes to the immediate vertical predecessors and delete the row.
      ii. Else, if there is at least one immediate vertical predecessor with data, check for an immediate successors OR of the same data type; if yes, copy contents of all data nodes to the immediate vertical successors and delete the row.
      iii. Else, go to 1 b.

Table Creation Algorithm—Bottom Up Approach:

The Bottom Up approach gets a table from an unstructured document, even in an absence of a table header. In some scenarios, due to image resolution or template design, the table header may not be extracted by OCR tools, and remaining table contents may be extracted. In this case, Top Up approach may fail, since the Top Up approach may not identify any Domain specific header line in $\mathcal{L}$. In the Bottom Up approach, domain keyword data type knowledge may be used to extract the tabular lines.

Input: OCR output of an Unstructured Document after preprocessing, $\mathcal{L}$.

Output: Relational Table printed on the document.

The steps involved in the Bottom Up approach of the algorithm the domain specific keyword data type may be used to identify a missing header and hence, to fabricate an indicative Table Header H. Other steps of the algorithm, where data may be aligned based on the column header data type still hold, subjective to the fact of identification of appropriate table header with accurate data types.

Steps:
1. Table Header Identification:
   For each line l in $\mathcal{L}$
      Split the line using the spatial delimiter.
      Identify if a line has two or more values which satisfy the acceptable data types $\mathcal{D}$ of Domain knowledge.
      If yes, based on the number of cells identified, create temporal tag-like column names such as Column_1, Column_2, etc. to form the table header H. Get the data types and the Coordinate for the column headers based on cell data.
      To validate, check for repetitive behavior. Use the spatial delimiter to split the line. Validate, if the identified data types from the first line still hold with data in the same position in this line. This step works if there are multiple tabular lines. However, this step could be ignored if there is a single tabular line.
2. Table Formation: From index l+1, align each l in $\mathcal{P}$ to H using LineAligner.
3. Graph Formation:
   a. Each cell in H forms a header node in the graph $\mathcal{G}$. Each cell in a tabular line forms a data node linked to the header node directly or through its vertical predecessor. Thus, forming an undirected graph with complete header nodes and sparse data nodes.
   b. Null data nodes may be inserted to get breadth-wise complete data nodes.
4. Data Curation: Use Table_Data_Curation to correctly align the data in the table.

FIGS. 14 and 15 depict sample inputs and outputs of the graph theoretic engine, according to one or more embodiments.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). The medium may be, for example, a memory, a transportable medium such as a CD, a DVD, a Blu-ray™ disc, a floppy disk, or a diskette. A computer program embodying the aspects of the exemplary embodiments may be loaded onto the retail portal. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Moreover, as disclosed herein, the term "computer-readable medium" includes, but is not limited to portable or fixed storage devices, optical storage devices and various other mediums capable of storing, or containing data. One or more computer-readable media can comprise computer-executable instructions that, when executed, perform any of the methods described herein.

Accordingly, the specification and drawings are to be regarded in an illustrative rather than a restrictive sense.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A method of recognizing data in a table area from unstructured data comprising:
    detecting, through at least one processor, at least one table area from an input stream of unstructured data received over a computer network;
    recognizing, through at least one processor, at least one table header associated with the detected at least one table area;
    determining, through at least one processor, at least one column delimiter associated with each column of the detected at least one table area;
    extracting, through at least one processor, tabular data associated with the detected at least one table area in association with at least one domain specific library, wherein in the absence of the detecting the at least one table area and the recognizing the at least one table header associated with the detected at least one table area in at least one of page of the unstructured data:
        splitting each line in the at least one page of the unstructured data with the absence using a spatial delimiter; and
        recognizing at least one additional table header based on domain specific keyword data applied to the splitting each line in the at least one page of the unstructured data with the absence using the spatial delimiter; and
    mapping, through at least one processor, at least one of the extracted tabular data or the extracted additional tabular data to at least one target schema to store onto a relational database.

2. The method of claim 1, wherein the tabular data is the data in the detected at least one table area.

3. The method of claim 1, wherein the at least one domain specific library includes one or more of column vocabulary or rules to determine one or more column names.

4. The method of claim 1, further comprising:
    removing, through at least one processor, at least one outlier associated with the tabular data.

5. The method of claim 4, wherein the outlier is at least one of a document related text, watermark, or noise.

6. The method of claim 1, wherein the unstructured data is one or more of a free form document, digitized document, or document without a predefined layout.

7. The method of claim 6, wherein the digitized document is one or more of an image file or PDF.

8. A non-transitory computer readable medium having stored thereon instructions comprising executable code which when executed by one or more processors, causes the one or more processors to
    detect at least one table area from an input stream of unstructured data received over a computer network;
    recognize at least one table header associated with the detected at least one table area;
    determine at least one column delimiter associated with each column of the detected at least one table area is determined;

extract tabular data associated with the detected at least one table area in association with at least one domain specific library, wherein in the absence of the detect the at least one table area and the recognize the at least one table header associated with the detected at least one table area in at least one of page of the unstructured data:
  split each line in the at least one page of the unstructured data with the absence using a spatial delimiter; and
  recognize at least one additional table header based on domain specific keyword data applied to the split each line in the at least one page of the unstructured data with the absence using a spatial delimiter; and
map at least one of the extracted tabular data or the extracted additional tabular data to at least one target schema to store onto a relational database.

9. The non-transitory computer readable medium of claim 8, wherein the tabular data is the data in the detected at least one table area.

10. The non-transitory computer readable medium of claim 8, wherein the at least one domain specific library includes one or more of column vocabulary or rules to determine one or more column names.

11. The non-transitory computer readable of claim 8 wherein at least one outlier associated with the tabular data is removed, through at least one processor.

12. The non-transitory computer readable medium of claim 11, wherein the outlier is at least one of a document related text, watermark, or noise.

13. The non-transitory computer readable medium of claim 8, wherein the unstructured data is one or more of a free form document, digitized document, scanned document, document with a predefined layout, or document without a predefined layout.

14. The non-transitory computer readable medium of claim 13, wherein the digitized document is one or more of an image file or PDF.

15. An apparatus to convert unstructured tabular data to structured relational data, the apparatus comprising:
  one or more processors;
  a memory coupled to the one or more processor which are configured to be capable of executing programmed instructions comprising and stored in the memory to:
    detect at least one table area from an input stream of unstructured data received over a computer network;
    recognize at least one table header associated with the detected at least one table area;
    determine through at least one column delimiter associated with each column of the detected at least one table area;
    extract tabular data associated with the detected at least one table area in association with at least one domain specific library, wherein in the absence of the detect the at least one table area and the recognize the at least one table header associated with the detected at least one table area in at least one of page of the unstructured data:
      split each line in the at least one page of the unstructured data with the absence using a spatial delimiter; and
      recognize at least one additional table header based on domain specific keyword data applied to the split each line in the at least one page of the unstructured data with the absence using a spatial delimiter; and
    map at least one of the extracted tabular data or the extracted additional tabular data to at least one target schema to store onto a relational database.

16. The apparatus of claim 15, wherein the tabular data is the data in the detected at least one table area.

17. The apparatus of claim 15, wherein the at least one domain specific library includes one or more of column vocabulary or rules to determine one or more column names.

18. The apparatus of claim 15, wherein at least one outlier associated with the tabular data is removed, through at least one processor.

19. The apparatus of claim 18, wherein the outlier is at least one of a document related text, watermark, or noise.

20. The apparatus of claim 15, wherein:
  the unstructured data comprises one or more of a free form document, digitized document, scanned document, document with a predefined layout, or document without a predefined layout; and
  the digitized document comprises one or more of an image file or PDF.

* * * * *